(12) United States Patent
Moreira et al.

(10) Patent No.: US 12,164,921 B2
(45) Date of Patent: Dec. 10, 2024

(54) COMPARING HASH VALUES COMPUTED AT FUNCTION ENTRY AND EXIT FOR INCREASED SECURITY

(71) Applicant: International Business Machines Corporation, Armonk, NY (US)

(72) Inventors: Jose E. Moreira, Irvington, NY (US); Arnold Flores, Round Rock, TX (US); Debapriya Chatterjee, Austin, TX (US); Kattamuri Ekanadham, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 17/123,711

(22) Filed: Dec. 16, 2020

(65) Prior Publication Data

US 2022/0191020 A1 Jun. 16, 2022

(51) Int. Cl.
*G06F 9/30* (2018.01)
*G06F 21/54* (2013.01)

(52) U.S. Cl.
CPC ........ *G06F 9/3005* (2013.01); *G06F 9/30076* (2013.01); *G06F 9/30101* (2013.01); *G06F 21/54* (2013.01)

(58) Field of Classification Search
CPC ............... G06F 9/3005; G06F 9/30076; G06F 9/30098; G06F 9/30101; G06F 21/52; G06F 21/54; G06F 21/55; G06F 21/566
See application file for complete search history.

(56) References Cited

U.S. PATENT DOCUMENTS

| | | |
|---|---|---|
| 7,752,459 B2 | 7/2010 | Cowan et al. |
| 8,571,993 B2 | 10/2013 | Kocher et al. |
| 9,514,305 B2 | 12/2016 | Acar et al. |
| 9,891,918 B2 | 2/2018 | Hooker et al. |
| 9,898,351 B2 | 2/2018 | Chaffin et al. |
| 10,317,976 B2 | 6/2019 | Schluessler et al. |
| 10,333,965 B2 | 6/2019 | Gathala et al. |

(Continued)

FOREIGN PATENT DOCUMENTS

CN 110362503 A 10/2019

OTHER PUBLICATIONS

Arm, "ARM1136JF-S and ARM1136J-S Technical Reference Manual", Revision r1p5, 2009, Chapter 2, p. 10.*

(Continued)

*Primary Examiner* — David J. Huisman
(74) *Attorney, Agent, or Firm* — Scully, Scott, Murphy & Presser, P.C.

(57) ABSTRACT

In response to encountering a function entry instruction while running an application, a processor computes an entry hash value using a hash of three hash input parameters, wherein one of the input parameters is a secret key stored in the special purpose register. In response to encountering a function exit instruction, the processor computes an exit hash value using the same three input parameters and the same hash used when computing the entry hash value. The processor determines if the entry hash value is the same as the exit hash value. In response to the entry hash value being the same as the exit hash value the processor exits the function and in response to the entry hash value not being the same as the exit hash value the processor executes a trap interrupt.

19 Claims, 5 Drawing Sheets

| | | | |
|---|---|---|---|
| 0 | mflr | r0 | ⟩ save LR |
| 1 | std | r0,offset1(r1) | |
| 2 | hashgen | r0,r0,r1 | ⟩ compute hash |
| 3 | std | r0,offset2(r1) | ⟩ save hash |
| 4 | std | r31,offset3(r1) | ⟩ save GPR31 | r1= stack pointer

| | | | |
|---|---|---|---|
| 0 | ld | r31,offset2(r1) | ⟩ restore hash |
| 1 | ld | r0,offset1(r1) | |
| 2 | mtlr | r0 | ⟩ restore LR |
| 3 | hashgen | r0,r0,r1 | ⟩ check hash |
| 4 | tdne | r0,r31 | |
| 5 | ld | r31,offset3(r1) | ⟩ restore GPR31 |
| 6 | blr | | ⟩ return | r1= stack pointer

(56) References Cited

U.S. PATENT DOCUMENTS

| | | | |
|---|---|---|---|
| 10,409,600 B1* | 9/2019 | Sierra | G06F 12/1408 |
| 2014/0096245 A1* | 4/2014 | Fischer | G06F 21/566 |
| | | | 726/23 |
| 2016/0171211 A1* | 6/2016 | Chen | G06F 21/54 |
| | | | 726/23 |
| 2018/0089422 A1 | 3/2018 | Kounavis et al. | |
| 2018/0183574 A1* | 6/2018 | Ghosh | G06F 21/44 |
| 2018/0260564 A1* | 9/2018 | Porteboeuf | G06F 11/28 |
| 2019/0087566 A1 | 3/2019 | Hosie | |
| 2020/0082066 A1 | 3/2020 | Semeria et al. | |
| 2020/0082070 A1 | 3/2020 | Semeria et al. | |
| 2020/0125501 A1 | 4/2020 | Durham et al. | |

OTHER PUBLICATIONS

Hyde, "The Art of Assembly Language", Chapter 17—Interrupts, Traps, and Exceptions, Sep. 30, 2012, [retrieved on May 17, 2022]. Retrieved from the Internet <URL: https://web.archive.org/web/20120930013119/http://www.plantation-productions.com/Webster/www.artofasm.com/DOS/AoADosIndex.html>, 10 pages.*

Lawlor, "PowerPC Assembly Language", Jun. 2, 2016, 4 pages.*

Wikipedia, "HMAC", Dec. 2, 2019, 6 pages.*

Qualcomm. "Pointer Authentication on ARMv8.3: Design and Analysis of the New Software Security Instructions" whitepaper from Qualcomm https://www.qualcomm.com/media/documents/files/whitepaper-pointer-authentication-on-armv8-3.pdf. Jan. 2017. p 1-12.

Safenet. "Hardware and Software Authentication: Choosing the Right Approach Decision Guide." Google.com, 2018, 7 pages.

Anonymous. "A Method of Verifying the Intended Recipient of Any Communication for Improved Security." IP.com; IPCOM000252449D. Jan. 12, 2018. 4 pages.

Anonymous. "Methodology and Procedure for Secure Granular Authorization and Audit Implementation in Distributed Enterprise Computing Environment." IP.com; IPCOM000237293D. Jun. 11, 2014. 18 pages.

Anonymous. "A Practical Code Signing Server for the Enterprise." IP.com; IPCOM000236621D. May 6, 2014. 11 pages.

Asokan, N. "Hardware-Assisted Run-Time Protection on Balancing Security and Deployability." Aalto University. 2017. 38 pages.

Liljestrand et al. "PAC it up: Towards Pointer Integrity using ARM Pointer Authentication." In 28th USENIX Security Symposium (USENIX Security 19) https://www.usenix.org/conference/usenixsecurity19/presentation/liljestrand. Aug. 14, 2019-Aug. 16, 2019. pp. 177-194.

Mashtizadeh et al. "CCFI: Cryptographically Enforced Control Flow Integrity." In Proceedings of the 22nd ACM SIGSAC Conference on Computer and Communications Security (CCS '15). Association for Computing Machinery, New York, NY, USA, DOI:https://doi.org/10.1145/2810103.2813676, 2015. 941-951.

Khalifa et al. "Memory Controller Architectures: A Comparative Study." Google , Research Gate. Dec. 2013. 7 pages.

Nuclei System Technology. "Dual-Mode Configurable RISC-V Processor IP." Google, 2017. 21 pages.

Anonymous. "Power-Saving Mode Control with Dynamically-Controlled Access." IP.com; IPCOM000239255D. Oct. 23, 2014. 5 pages.

Anonymous. "Dynamic, Adaptive Resolution for Performance Instrumentation." IP.com; IPCOM000237621D. Jun. 27, 2014. 5 pages.

Anonymous. "System and Method for Dynamic Identification of Refmon Check Necessity." IP.com; IPCOM000234759D. Feb. 3, 2014. 4 pages.

International Search Report dated Jan. 20, 2022, received in a corresponding foreign application, 9 pages.

* cited by examiner

| | | | |
|---|---|---|---|
| 0 | mflr | r0 | — *save* LR |
| 1 | std | r0,offset1(r1) | |
| 2 | hashgen | r0,r0,r1 | — *compute hash* |
| 3 | std | r0,offset2(r1) | — *save hash* |
| 4 | std | r31,offset3(r1) | — *save* GPR31 | r1= stack pointer

Fig. 6

| | | | |
|---|---|---|---|
| 0 | ld | r31,offset2(r1) | — *restore hash* |
| 1 | ld | r0,offset1(r1) | |
| 2 | mtlr | r0 | — *restore* LR |
| 3 | hashgen | r0,r0,r1 | |
| 4 | tdne | r0,r31 | — *check hash* |
| 5 | ld | r31,offset3(r1) | — *restore* GPR31 |
| 6 | blr | | — *return* | r1= stack pointer

Fig. 7

COMPARING HASH VALUES COMPUTED AT FUNCTION ENTRY AND EXIT FOR INCREASED SECURITY

BACKGROUND

The present invention generally relates to information handling and data processing systems, processors, and memory systems, and more specifically to providing increased security to information handling systems, processors, and memory subsystems, for example, while running software applications.

With recent advancements in information technology and the wide use of the Internet to store and process information, more and more demands are placed on the acquisition, processing, storage and dissemination of information by computing systems. Computing systems are being developed to increase the speed at which the computers are able to execute increasingly complex applications for business, personal use, and entertainment. Overall computer system performance is affected by each of the key elements of the computer structure, including the performance/structure of the processors, any memory caches, input/output (I/O) subsystems, efficiency of the memory control functions, the performance of the memory devices and systems, and any associated memory interface elements, and the type and structure of the memory interconnect interfaces.

Modern computer systems typically contain several integrated circuits (ICs), including a processor which may be used to process information in the computer system. The information processed by a processor may include computer instructions that are executed by the processor as well as data, which is manipulated by the processor using the computer instructions. The computer instructions and data are typically stored in a main memory in the computer system.

Keeping unauthorized users and/or rogue software from accessing information handling and data processing systems is becoming increasingly important and difficult to achieve. In one situation, a user or software application may be authorized to have access to an information handling system, a processor, register files, and/or the memory subsystem, but may not be authorized to have complete access to the complete system, all the register files, or all of the memory subsystem. Accordingly, while the user or software application may be authorized to access portions of the system, the user and/or software application is not authorized to access the entire system, all the register files, and/or all the memory subsystem. In other situations, a user and/or software application is not authorized to access any portion of the computing system, the register files, and/or any portion of the memory subsystem. Protecting systems, register files, and/or memory subsystems from being accessed by an unauthorized user and/or software application can be difficult.

Application software stores code pointers such as function return addresses or data such as local variable values or pointer variables in a stack when calling a function. Malicious users can exploit code vulnerabilities such as buffer overflow, array access without bounds check, use after free, and other techniques to attack and overwrite the contents of the stack such that on return from a function, a code pointer or data value not intended by the software application is used. This can result in hijacking the control flow of a program since the return address is no longer the intended return target. This is sometimes referred to as Return Oriented Programming (ROP) attack. These techniques can also be used to manipulate software to access data values the software program was not meant to access and reveal secret information without affecting the control flow. This type of attack is sometimes referred to as Data Oriented Programming (DOP) attack. It would be beneficial if such attacks and their techniques could be overcome to provide more secure information handling systems, processors, memory subsystems and software applications running on such systems, devices, and subsystems.

SUMMARY

The summary of the disclosure is given to aid understanding of a computer system, computer architectural structure, processor, their methods of operation, and execution of software applications, including techniques of providing a more secure methods of operation for such systems, processors, and software applications running on such systems and/or devices, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, register files, their method of operation, and manner of executing software applications to achieve different effects.

Aspects of the present disclosure provide in one or more embodiments a system, method, and/or computer program product of processing data in a processor that includes in response to encountering a function call-up instruction for performing a function while running a software program, computing an entry hash value using a hash of three hash input parameters, wherein one of the hash input parameters is a secret key stored in a special purpose register; and storing the entry hash value in a first memory location. The first memory location in an aspect is at a first offset from a stack pointer in a first general purpose register. The system, method, and/or computer program product in an embodiment further includes copying a value provided by a link register into a second general purpose register entry; and storing the value from the second general purpose register entry to a second memory location. The second memory location preferably is at a second offset from the stack pointer in the first general purpose register entry. The three hash parameter inputs for computing the entry hash optionally include a first hash input parameter that is a value in the first general purpose register entry, a second hash input parameter that is a value in the second general purpose register entry, and a third hash input parameter that is the secret key. The special purpose register storing the secret key in an aspect is accessible only in a privilege level higher than a privilege level computing the entry hash value.

The method, system, and/or computer program product in an aspect further includes, prior to exiting the function while running a software application, computing an exit hash value using the same three input parameters and the same hash used when computing the entry hash value; and determining if the entry hash value is the same as the exit hash value. In one or more embodiments, the method, system, and/or computer program product further includes: in response to the entry hash value being equal to the exit hash value, performing a function return to exit the function; and in response to the entry hash value not being equal to the exit hash value, executing a trap interrupt. The trap interrupt preferably transfers control to an operating system. In a further aspect, prior to exiting the function, the method, system and/or computer program product further comprises: loading the entry hash value from the second memory location into a third general purpose register; loading the value from the first memory location into the second general purpose register; and moving the value from the second general purpose register to the link register.

A system for executing instructions in a software application is disclosed that includes: a processor having circuitry for processing programming, the processor comprising: a decode unit comprising circuitry for decoding the programming instructions; an issue unit comprising circuitry for receiving the decoded programming instructions and issuing the decoded programming instructions, and an execution unit comprising circuitry for executing the decoded programming instructions issued by the issue unit, the execution unit associated with a special purpose register; and a non-transitory computer-readable medium having the programming instructions embodied therewith, the programming instructions executable by the processor to cause the processor to: in response to encountering a function entry instruction to perform a function, compute an entry hash value using a hash of three hash input parameters, wherein one of the input parameters is a secret key stored in the special purpose register; prior to exiting the function, compute an exit hash value using the same three input parameters and the same hash used when computing the entry hash value; and determine if the entry hash value is the same as the exit hash value.

A method and/or system for handling data in a processor are disclosed that include in response to encountering a function call-up instruction for performing a function, computing an entry hash value using a hash of one or more hash input parameters, wherein one of the input parameters is a secret key stored in a special purpose register; prior to exiting the function, computing an exit hash value using the same one or more input parameters and the same hash used when computing the entry hash value; determining if the entry hash value is the same as the exit hash value; and in response to the entry hash value not equaling the exit hash value, transferring control to an operating system and not executing the return function instruction.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features and embodiments of the information handling system, computer system, computer architectural structure, processor, register files, their method of operation, and manner of executing software applications will be better understood when read in conjunction with the figures provided. Embodiments are provided in the figures for the purpose of illustrating aspects, features, and/or various embodiments of the computer system, computer architectural structure, processor, register files, and their method of operation including their manner of executing software applications, but the claims should not be limited to the precise arrangement, structures, assemblies, subassemblies, functional units, mechanisms, features, aspects, embodiments, devices, methods, processes, or techniques shown, and the arrangements, structures, assemblies, subassemblies, functional units, mechanisms, features, aspects, embodiments, devices, methods, processes, and techniques shown may be used singularly or in combination with other arrangements, structures, assemblies, subassemblies, functional units, mechanisms, features, aspects, embodiments, devices, methods, processes, and/or techniques.

FIG. 6 depicts a diagrammatic illustration of code for insertion into a software program at function entry to compute a hash according to an embodiment of the present disclosure.

FIG. 7 depicts a diagrammatic illustration of code for insertion into a software program at or before function exit to check a hash in accordance with an embodiment of the present disclosure.

DETAILED DESCRIPTION

Figure 1:
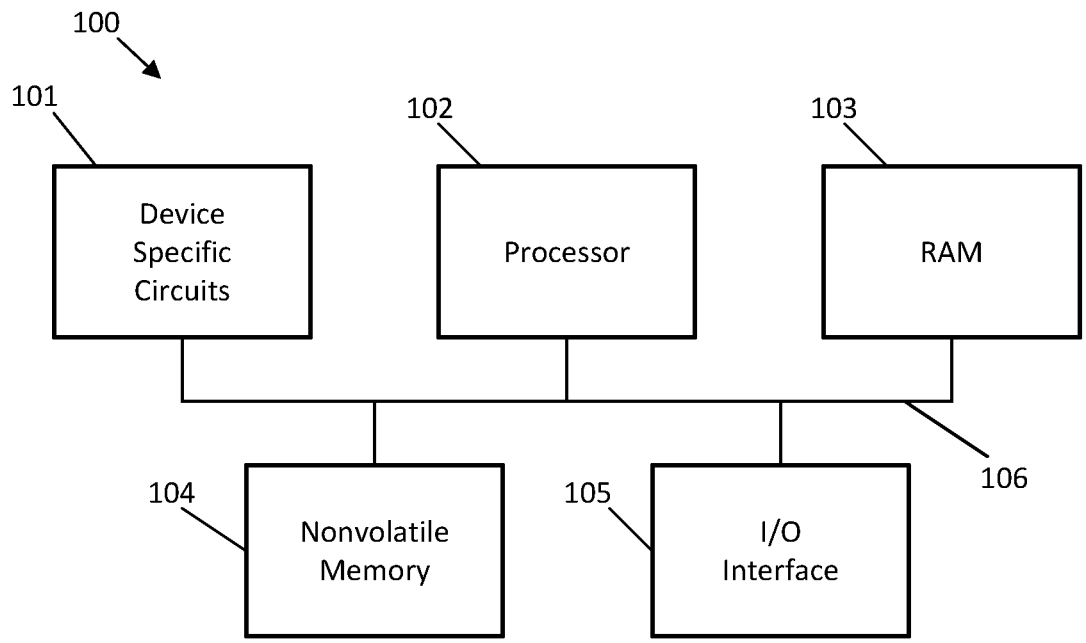
FIG. 1 depicts a general computing or data processing system in accordance with an embodiment of the present disclosure.

The following description is made for illustrating the general principles of the invention and is not meant to limit the inventive concepts claimed herein. In the following detailed description, numerous details are set forth in order to provide an understanding of the information handling system, computer system, computer architectural structure, processor, memory, functional units, register files, memory subsystem, and their method of operation including their manner of executing software applications, however, it will be understood by those skilled in the art that different and numerous embodiments of the computer system, computer architectural structure, processor, functional units, register files, memory subsystem, and their method of operation including their manner of executing software applications may be practiced without those specific details, and the claims and invention should not be limited to the embodiments, assemblies, subassemblies, structures, arrangements, mechanisms, functional units, features, aspects, processes, methods, techniques or details specifically described and shown herein. Further, particular features, functional units, mechanisms, structures, arrangements, embodiments, aspects, and techniques described herein can be used in combination with other described features, functional units, mechanisms, structures, arrangements, embodiments, aspects, and techniques in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and the terms "comprises" and/or "comprising" when used specifies the presence of stated features, integers, steps, operations, elements and/or components, but do not preclude the presence or addition of one or more other features, integers, steps, operations, elements, components, and/or groups thereof.

The following discussion omits or only briefly describes conventional features of information processing systems, including processors (e.g. microprocessors), memory subsystems, and system architecture, and their method of operation including their manner of executing software applications, which are apparent to those skilled in the art. It is assumed that those skilled in the art are familiar with the general architecture of computer systems, memory subsystems, processors, register files, and their method of operation including their manner of executing software applications. It may be noted that a numbered element is numbered according to the figure in which the element is introduced, and is typically, but not necessarily, referred to by that number throughout succeeding figures.

A computing or data processing system 100 suitable for use in the present disclosure may take many forms, one of which is shown in FIG. 1, where computing or data processing (information handling) system 100 is configured for storing and/or executing program code (e.g., software applications). In one embodiment, information handling system 100 may include at least one processor 102, which can be, or can be part of, a controller, coupled directly or indirectly to memory devices and input/output devices through a system bus 106, as shown in FIG. 1. Computing system 100 in FIG. 1 is shown with a processor 102 (also referred to as a central processing unit (CPU) or microprocessor), Random Access Memory (RAM) 103, nonvolatile memory 104, device specific circuits 101, and I/O interface 105. Alternatively, or additionally, the RAM 103 and/or nonvolatile memory 104 may be contained in the processor 102 as could the device specific circuits 101 and I/O interface 105. The processor 102 may comprise, for example, an off-the-shelf microprocessor, custom processor, Field Programmable Gate Array (FPGA), Application Specific Integrated Circuit (ASIC), discrete logic, etc., or generally any device for executing digital instructions. The RAM 103 is typically used to hold variable data, stack data, executable instructions, etc.

According to various approaches, the nonvolatile memory 104 may comprise any type of nonvolatile memory such as, but not limited to, Electrically Erasable Programmable Read Only Memory (EEPROM), flash Programmable Read Only Memory (PROM), battery backup RAM, hard disk drives, etc. The nonvolatile memory 104 is typically used to hold the executable firmware and any nonvolatile data such as programming instructions and applications that can be executed to cause the processor 102 to perform certain functions.

In some embodiments, the I/O interface 105 may include a communication interface that allows the processor 102 to communicate with devices external to the controller. Examples of the communication interface may comprise, but are not limited to, serial interfaces such as RS-232, USB (Universal Serial Bus), Small Computer Systems Interface (SCSI), RS-422 or a wireless communication interface such as Wi-Fi, Bluetooth, near-field communication (NFC) or other wireless interfaces. The computing system 100 may communicate with an external device via the communication interface 105 in any communication protocol such as, for example, Automation Drive Interface (ADI).

Figure 2:
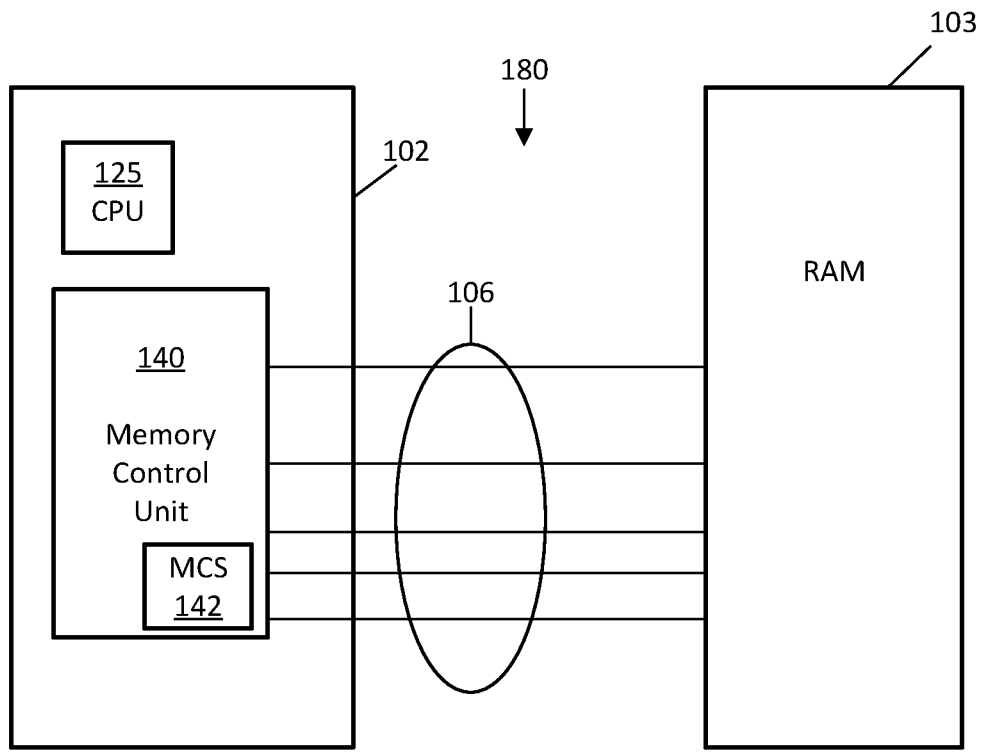
FIG. 2 depicts a processor and memory subsystem according to an embodiment of the present disclosure.

FIG. 2 depicts an exemplary processing system 180 in which the present disclosure can be practiced that may be part of a larger computer system structure or network. The processing system 180 includes a control processor system or processor 102, which is a processing subsystem that includes at least one processor unit (CPU) 125 that may be configured to interface with a Memory Control Unit (MCU) 140. The CPU 125, also referred to as a micro-processor, may be a module that processes read, write, and configuration requests from a system controller (not depicted). The CPU 125 may be a multi-core processor. The MCU 140 may include a memory controller synchronous (MCS) 142, also referred to as a memory controller, that controls communication with one or more memory devices, e.g., DRAMs, (not shown in FIG. 2) in a memory subsystem 103. The MCU 140 and the MCS 142 may include one or more processing circuits, or processing may be performed by or in conjunction with the processor 125. The control processor system 102 communicates with the memory subsystem 103 through a communications bus 106.

Figure 3:
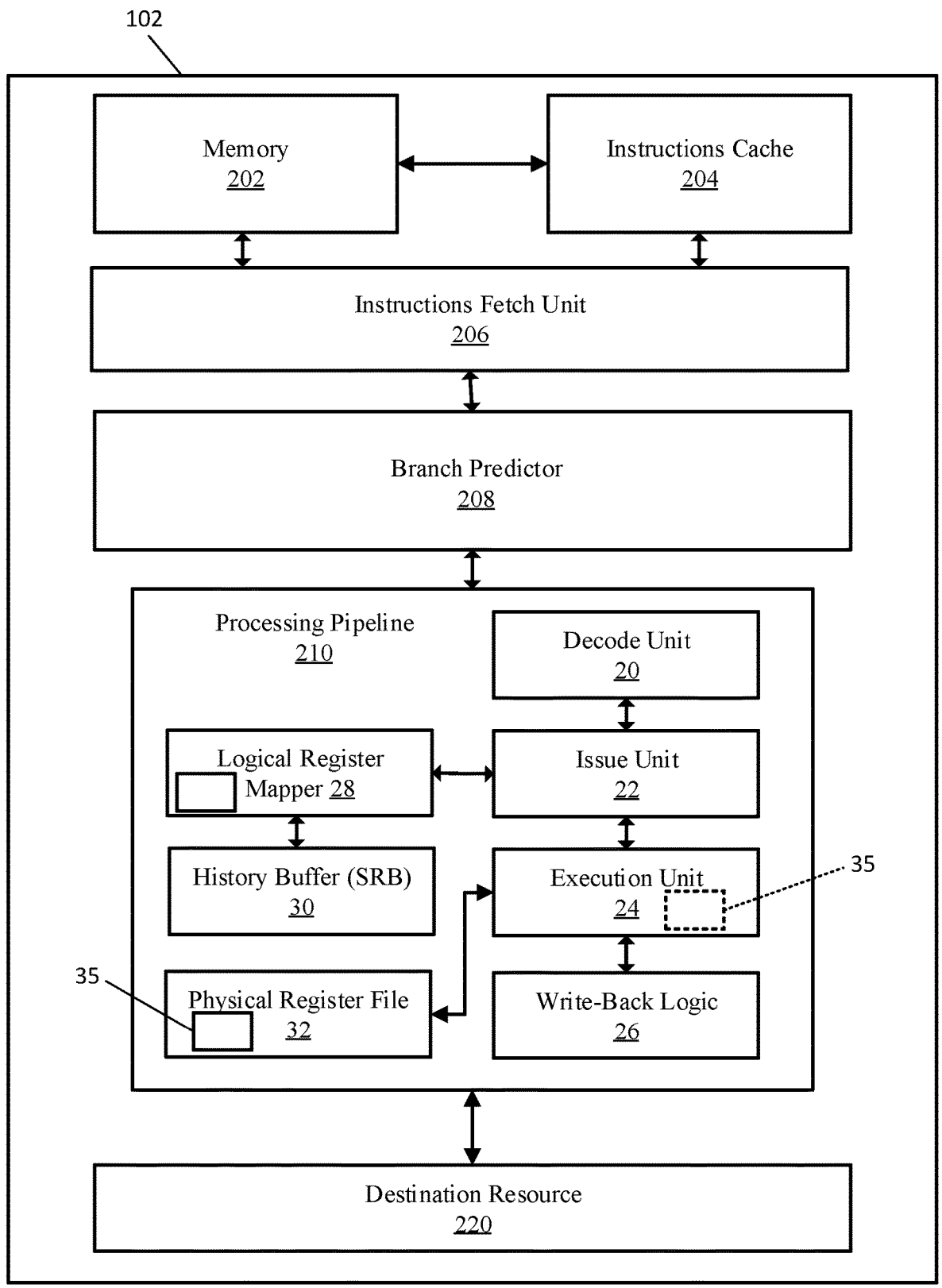
FIG. 3 depicts a block diagram of a processor in accordance with an embodiment of the present disclosure.

FIG. 3 depicts a block diagram of a processor 102 according to an embodiment in which the present disclosure can be practiced. The processor 102 may be a pipelined processor configured to execute one or more streams of instructions or threads. A thread (also referred to as an instruction stream) comprises a sequence or collection of instructions that together perform a specific task. The threads may be instruction streams from different parts of the same program executing on the processor, or may be from different programs executing on the processor, or combinations thereof. The processor in one embodiment may be a multithreaded processor and may process multiple threads concurrently.

The processor 102, according to one embodiment, may include memory 202, an instruction cache 204, an instruction fetch unit 206, a branch predictor 208, a processing pipeline 210, and Destination Resource 220. The processor 102 may be included within a computer processor or otherwise distributed within a computer system. Instructions and data can be stored in memory 202, and the instruction cache 204 may access instructions in memory 202 and store the instructions, e.g., the instructions of the various threads, to be fetched in cache memory 204. Memory 202 may include any type of volatile or nonvolatile memory, such as, for example, cache memory. Memory 202 and instruction cache 204 can include multiple cache levels. A data cache (not shown) may also be included in the processor 102. The processor 102 preferably permits multiple threads to share the functional units of the processor 102 (e.g., instruction fetch and decode units, caches, branch prediction units, and execution units) preferably in concurrent fashion.

In FIG. 3, a simplified example of the instruction fetch unit 206 and the processing pipeline 210 are depicted. In various embodiments, the processor 102 may include one or more processing pipelines 210 and instruction fetch units 206. In an embodiment, the processing pipeline 210 includes a decode unit 20, an issue unit 22, an execution unit 24, write-back logic 26, a logical register mapper 28, a history buffer, e.g., Save & Restore Buffer (SRB) 30, and a physical register file 32. The instruction fetch unit 206 and/or the branch predictor 208 may also be part of the processing pipeline 210. The processing pipeline 210 may also include other features, such as error checking and handling logic, one or more parallel paths through the processing pipeline 210, and other features now or hereafter known in the art. The pipeline may also be broken down and illustrated differently. While a forward path through the processor 102 is shown in FIG. 3, other feedback and signaling paths may be included between elements of the processor 102. The processor 102 may include other circuits, functional units, and components.

The instruction fetch unit 206 fetches instructions from the instruction cache 204 for further processing by the decode unit 20. The decode unit 20 decodes instructions and passes the decoded instructions, portions of instructions, or other decoded data to the issue unit 22. The decode unit 20 may also detect branch instructions which were not predicted by branch predictor 208. The issue unit 22 analyzes the instructions or other data and transmits the decoded instructions, portions of instructions, or other data to execution unit 24 in the pipeline 210 based on the analysis. The execution unit 24 performs and executes operations specified by the instructions issued to the execution unit 24. The execution unit 24 can include a plurality of execution units, such as, for example, fixed-point execution units, floating-point execution units, load/store execution units, vector scalar execution units, and/or other execution units. The physical register file 32 holds data for the execution units 24. The logical register mapper 28 contains entries which provide a mapping between a logical register entry (LReg) and an entry in the physical register file 32. When an instruction wants to read a logical register entry (LReg), the logical register mapper 28 informs the issue unit 22, which informs the execution unit 24 where the data in the physical register file 32 can be located.

When a mispredicted branch instruction or other exception is detected, instructions and data subsequent to the mispredicted branch or exception are discarded, e.g., flushed from the various units of processor 110. A history buffer, e.g., Save & Restore Buffer (SRB) 30, contains both speculative and architected register states and backs up the logical register file data when a new instruction is dispatched. In this regard, the history buffer 30 stores information from the logical register mapper 28 when a new instruction evicts data from the logical register mapper 28 in case the new instruction is flushed and the old data needs to be recovered. The history buffer (SRB) 30 keeps the stored information until the new instruction completes. The history buffer (SRB) 30 interfaces with the logical register mapper 28 in order to restore the contents of logical register entries from the history buffer (SRB) 30 to the logical register mapper 28, updating the pointers in the logical register mapper 28 so instructions know where to obtain the correct data, e.g., the processor is returned to the state that existed before the interruptible instruction, e.g., the branch instruction was mispredicted.

The write-back logic 26 writes results of executed instructions back to a destination resource or target 220. The destination resource 220 may be any type of resource, including registers, cache memory, other memory, I/O circuitry to communicate with other devices, other processing circuits, or any other type of destination for executed instructions or data. One or more of the processor pipeline units may also provide information regarding the execution of conditional branch instructions to the branch predictor 208.

Instructions may be processed in the processor 102 in a sequence of logical, pipelined stages. However, it should be understood that the functions of these stages may be merged together so that this particular division of stages should not be taken as a limitation, unless such a limitation is clearly indicated in the claims herein. Indeed, some of the stages are indicated as a single logic unit in FIG. 3 for the sake of simplicity of understanding, and further details as relevant will be provided below.

In certain aspects, a processor 102 may have multiple execution/processing slices with each slice having one or more of the units shown in FIG. 3. For example, each processing slice may have its own processing pipeline 210 with functional/execution units 24. A processor 102 having multiple processing slices may be capable of executing multiple instructions simultaneously, for example, one instruction in each processing slice simultaneously in one processing cycle. Such a processor having multiple processing slices may be referred to as a multi-slice processor or a parallel-slice processor. Simultaneous processing in multiple slices may considerably increase processing speed. In single-thread (ST) mode a single thread is processed, and in SMT mode multiple threads are processed, e.g., in one or more embodiments two threads (SMT2) or four threads (SMT4) are simultaneously processed.

Information handling and data processing systems, computer systems, processors, and/or digital logic systems are vulnerable to attack, for example, by Return Oriented programming (ROP) attacks, which can result in hijacking control over the flow of a program. It would be advantageous and beneficial to provide systems and techniques to provide better security against such attacks. In one or more embodiments, a more secure information handling system, processor, and technique includes computing and storing a cryptographic signature upon a function call-up, and verifying the cryptographic signature upon function return (function exit), and in an embodiment verifying the cryptographic signature before exiting the function and making reference to the stack pointer for control over the program flow or data access. The cryptographic signature in one or more embodiments is a hash of three parameters $H(x,y,z)$, where preferably one of the parameters is a secret key. In an embodiment, the cryptographic signature of a stack pointer computed with a secret key provided in a separate location is utilized. In an embodiment the secret key is only accessible in supervisor mode, and in an aspect is stored in a special purpose register (SPR) in a privilege level above the privilege level where the hash is calculated. In an embodiment, enhanced security, e.g., a more secure signature, is provided by the cryptographic strength of the hash function used to compute the signature, and by a secret key that is used as one of the parameters to compute the hash.

In one or more embodiments a new processor instruction is introduced to compute a cryptographic hash of three parameters where a first parameter (value) is provided by a first register, preferably a general purpose register (GPR); a second parameter (value) is provided by a second register, preferably a general purpose register (GPR); and a third parameter is provided by a third register, preferably a special purpose register (SPR). The third parameter in one or more embodiments is preferably a secret key that is set in a special purpose register (SPR). The hash may be represented by RT<=H(RA, RB, <secret key>). The special purpose register (SPR) storing the secret key in one or more embodiments is not directly accessible in the privilege level that computes the hash (e.g., not the privilege level that executes the hash computation), but is accessible in the privilege levels above the privilege level executing the hash computation instruction.

In an embodiment, a new privileged access only special purpose register (SPR) is used to store the current secret key for each thread that is only accessible in supervisor mode. In an aspect, the exact function and secret key are implementation specific, where the secret key can be part of the process context. In an embodiment, the secret key associated with a process in the special purpose register (SPR) is set before that process is scheduled on a hardware thread. In one or more embodiments the secret is set in a supervisor level of operation, also referred to as a state of execution in a processor. In this regard, applications such as email client, browsers, etc., run in a privilege state known as user mode or problem state. The operating system typically executes on the processor in a higher privilege state known as the supervisor privilege state. There are registers in the processor that can only be directly accessed (e.g., read or written) in the supervisor privilege state, and results in an access exception when attempts are made to access (read/write) the register directly in a user mode/problem state. The key in one or more embodiments is kept in such a register and accordingly, for applications executing in the user mode/problem state the register is considered secret or hidden.

The special purpose register (SPR) for storing the secret key, in an embodiment, is a per hardware thread register, and in an aspect special purpose register (SPR) 35 holding the secret key is located in the Physical Register File 32 associated with Execution Unit 24 of the processor 102 shown in FIG. 3, but it is contemplated that the special purpose register (SPR) 35 holding the secret key can be located in other locations in the processor. For example, the Physical Register File 32 with special purpose register (SPR) 35 could reside within the Execution Unit 24, or a separate special purpose register (SPR) 35 could be located in the Execution Unit 24 as shown by dashed lines in FIG. 3.

In one or more embodiments, the new instruction to compute the hash is referred to as "hashgen", but other terminology is contemplated for the new instruction. The new "hashgen" instruction, in an embodiment, computes a cryptographic hash of three parameters, including in an embodiment using a secret key value as one of the parameters. In an embodiment, the secret key is stored in a special purpose register (SPR) with restricted access, and in an aspect is stored in a special purpose register (SPR) that is only accessible in the privilege level above the privilege level executing the new compute hash instruction ("hashgen"). In an embodiment, the cryptographic hash instruction "hashgen" computes a cryptographic hash of a stack pointer provided by a general purpose register (GPR) of double word width (64-bits), a tag/context ID by another general purpose register (GPR) of double word width (64-bits), and the secret key. The secret key, in an embodiment is a double word (64 bit) field not directly accessible in the privilege level that the compute cryptographic hash instruction ("hashgen") is executing within.

The processor is provided support, e.g., circuits, logic, firmware, etc., to support the compute hash function, i.e., the new ("hashgen") instruction, and the compiler will insert the instruction in appropriate places and thus protect the application code from attack. Computing the hash (signature) using the "hashgen" instruction is typically performed at function call, e.g., upon entering a function in a software application where the processor is going to execute a number of instructions. The hashgen instruction is inserted in the code so upon a function call, e.g. at function entry, the hash (signature) is computed and stored in memory. Generally any hash function of choice that has the required input, output, and key width can be used.

Prior to or upon returning from a function, e.g., exiting a function, hashes (signatures) should be checked to determine if they match, because if they do not match, then the application/processor might be subject to an attack. Accordingly, at function return, e.g., upon exiting a function, a hash (signature 2) has to be recomputed and checked against the hash (signature 1) previously computed and saved to memory at function entry. In other words, the signatures (hash values) have to be authenticated so that the software pointer is verified to be accurate and is pointing at the intended target. In one or more embodiments, the hash (signature 2) can be recomputed prior to or upon function exit by using the same instruction that was used to generate the hash, e.g., the "hashgen" instruction used upon entry of the function. For example, upon or just prior to exiting a function, the hash (signature 2) can be recomputed using the new "hashgen" instruction that was used to compute the hash (signature 1) upon entering the function, and the recomputed hash (signature 2) can be checked against the hash value (the signature 1) that was stored in memory upon entering the function. The computed hash previously stored to memory (signature 1) can be called up and loaded, a new or recomputed hash (signature 1) can be generated using the same instruction to generate the hash upon function entry, e.g., "hashgen" instruction, and the recomputed hash (signature 2) can be compared against the hash value (signature 1) stored in memory. If the two hash values match (i.e., signature 1=signature 2), then the code can exit the function (return) and continue operations as it is likely that there was no malicious attack.

If the two hash values do not match (signature 1 not equal to signature 2), then there was an error and/or a potential malicious attack that should be addressed. In an aspect, a trap function can be incorporated if the recomputed hash value (signature 2) and stored hash values (signature 1) do not match. The trap function or trap interrupt can direct control to the operating system if the hashes (signatures) do not match as opposed to waiting for a default or permitting the function return instruction to execute. In this regard, a new instruction, referred to as "trapne" or "tdne" is used to perform the function of comparing the recomputed hash (signature 2) and the hash value from memory (signature 1), and if the hash values (signatures) do not match, then performing the trap function (trap interrupt) where control is transferred to the operating system, or some other trap can be instituted to avoid the attack or to further check the discrepancy (the mismatched signatures).

In an embodiment, a double-word sized hash (64-bits) is computed using the new "hashgen" instruction from a double word (64-bit) pointer and in an aspect the computed hash is stored in a location separate from where the pointer is stored, providing additional security to the processor and software applications running on the processor. The hash computation acts as a signature and makes it more difficult to attack the processor and take over its control as modifying a single memory location is not enough to falsify the signature and perform an attack. That is, in one or more embodiments, the return address of the stack pointer is saved in one memory location, and the computed hash, e.g., the signature, is stored in another location in memory. Accordingly, to successfully attack the processor operating the software program, modifying only the return address of the stack pointer is not sufficient to take over control of the processor and/or the executing program.

In addition, more secure hash functions can be implemented due to the ability to utilize a wider signature. For example, a double-word (64-bit) sized hash can be implemented due to the wider fields being used as the parameters (base values) for computing the hash. In an embodiment a sixty-four (64) bit value is used as the signature instead of a smaller field such as, for example, cramming the signature into a portion of the register field width, e.g., fitting signature into a portion (15 bits) of the effective address (EA) itself. In one or more embodiments, a trap exception or trap interrupt is generated when checking the hash to transfer control from the application to system software if there is a mismatch between the computed hash and the recomputed hash. The trap exception or trap interrupt is a type of exception generated in the processor when a user mode instruction runs into an error condition (in this case a mismatch of stored hash vs. recomputed hash), which transfers control over to the supervisor state. In an aspect, explicit hash check instructions are provided that transfer control from the application that is running to system software upon a mismatch of the recomputed hash. The optional trap exception in an embodiment moves/transfers program control to the supervisor state so that the return instruction does not execute providing better control than waiting for a fault to occur if the signatures (hashes) do not match.

One or more embodiments of the disclosure will be described with more detail, but it should be recognized that the invention should not be limited to these details unless explicitly set forth in the language of the claims. The instruction to compute the hash, preferably the secret hash, referred to as "hashgen", will take the form of: hashgen RT, RA, RB, and performs the following function: RT<=hash function (RA, RB, secret-key SPR) where RT, RA, RB are all general purpose registers, preferably 64-bit general purpose registers. The secret key is preferably a 64-bit key specified by a special purpose register (SPR) not directly accessible in the privilege level executing the hash by move-to SPR or move-from SPR instructions, but accessible in the privilege levels above it. In an embodiment, RB provides the code pointer being protected (e.g., the general purpose register that holds the memory address of the code pointer); RA provides the tag/context information (e.g., the general purpose register holding the context ID); "secret-key SPR" is a SPR holding the secret key; and RT is the return register to which the computed hash, e.g., the result/signature, is output or returned.

The instruction to generate the hash upon a function call up, e.g., upon entering a function, is typically used with a store instruction to store the hash in memory. Accordingly the instructions inserted into the code where a function call up (function entry) is located can be used as follows:

hashgen RT, RA, RB
store RT, D(RA) [Memory [RA+D]<=temp]

where the operation of storing the output of the hash computation (the signature) in memory is a separate instruction. In an embodiment, the hash computation instruction "hashgen" outputs the hash signature to another general purpose register (GPR), e.g., RT, and then operations to store the hash result (the signature) to memory can be performed with existing store instructions, e.g., "std". That is, the operation to store the hash computation, e.g., the signature, from RT to memory can be a separate store instruction, e.g., "std". In an embodiment, the value of the hash computation can be stored to memory by specifying an offset with respect to the input register specifying the tag/context information.

In an alternative embodiment, the compute/generate hash instruction can incorporate the store operation/instruction with the compute hash instruction so that the result of computing the hash, e.g., the signature, is stored right to memory without a separate store ("st") instruction. In an embodiment, the micro-operations of computing the hash and storing the result of the hash computation (the signature) from RT to memory can be a single instruction, which can be referred to as "hashgen" or can use a different term "hashst". In an aspect, the single instruction that performs the two micro-operations of computing and storing the hash, can include storing the hash by specifying an offset with respect to the input register specifying the tag/context information.

Recomputing the hash (signature 2) using the same "hashgen" instruction and checking against the hash (signature 1) previously calculated and stored in memory can take the following form:

load R1, D(RA)
hashgen RT, RA, RB
trapne R1, RT [compare and optionally trap if register values are different]

where "load" R1, D(RA) refers to loading into R1 the previously calculated value of the hash (signature 1) that was stored in memory, and "hashgen" RT, RA, RB recalculates the hash (signature 2) based upon current values in RA, RB, and in one or more embodiments an optional secret key. The instruction "trapne" (also referred to as "tdne") checks or compares the hash value (signature 1) loaded into R1 from memory against the current generated hash (signature 2) output to RT. In an embodiment, the "trapne" or "tdne" instruction can also include a trap function. For example, if upon comparing the values in the two registers R1, RT the values are not the same, then rather than waiting for a fault, control is transferred to the operating system and/or the operation exits the function but does not execute the function return instruction to continue executing the code. The optional trap function (trap interrupt) can be incorporated with the hash check operation so that a single instruction performs the comparison of the hash values (the signatures) and the trap function.

In an alternative embodiment a compact form of the instruction can incorporate the memory load instruction and the check hash/trap function in the same instruction. That is, the check hash signature instruction, "trapne" or "tdne" (which in an embodiment optionally includes the trap function), can incorporate the storage access, i.e., the load to memory instruction. Re-computing the hash (signature 2) using the same "hashgen" instruction, loading the hash value (signature 1) from memory, checking against the hash (signature 1) previously calculated and stored in memory, and optionally including the trap function, can take the following form:

hashgen RT, RA, RB
trapne R1, RT [compare and optionally trap if register values are different]

where "trapne" includes the operation of (1) loading the hash (signature 1) from memory, (2) checking the hash value (signature 1) from memory with the recomputed hash (signature 2), and (3) optionally performing the trap micro-operation, if included.

Checking the hash (signature) using the "hashgen" instruction, and in an embodiment using the "tdne" or "trapne" instruction, is typically performed prior to or upon exiting a function in a software application. The "ld" (load) instruction, the "hashgen" instruction, and "tdne" ("trapne") instruction (and in an embodiment a compact form of the instruction that incorporates the load instruction) are inserted so prior to or upon function exit (upon or prior to executing the function return instruction) a hash (signature 2) is recomputed and checked against the hash (signature 1) previously stored in memory upon or prior to entering the function.

The processor is provided with circuits, logic, functional units (e.g., special purpose register for secret key), firmware, etc. to support the compute hash function, e.g., the new (hashgen) instruction (or the compact version that incorporates the store instruction), and the new check hash and optionally the trap function, e.g., the "tdne" instruction (or the compact version that incorporates the load instruction), and the compiler will insert the new instructions in appropriate places (at function call-up and function return) and thus protect the application code from attack.

Figure 4:
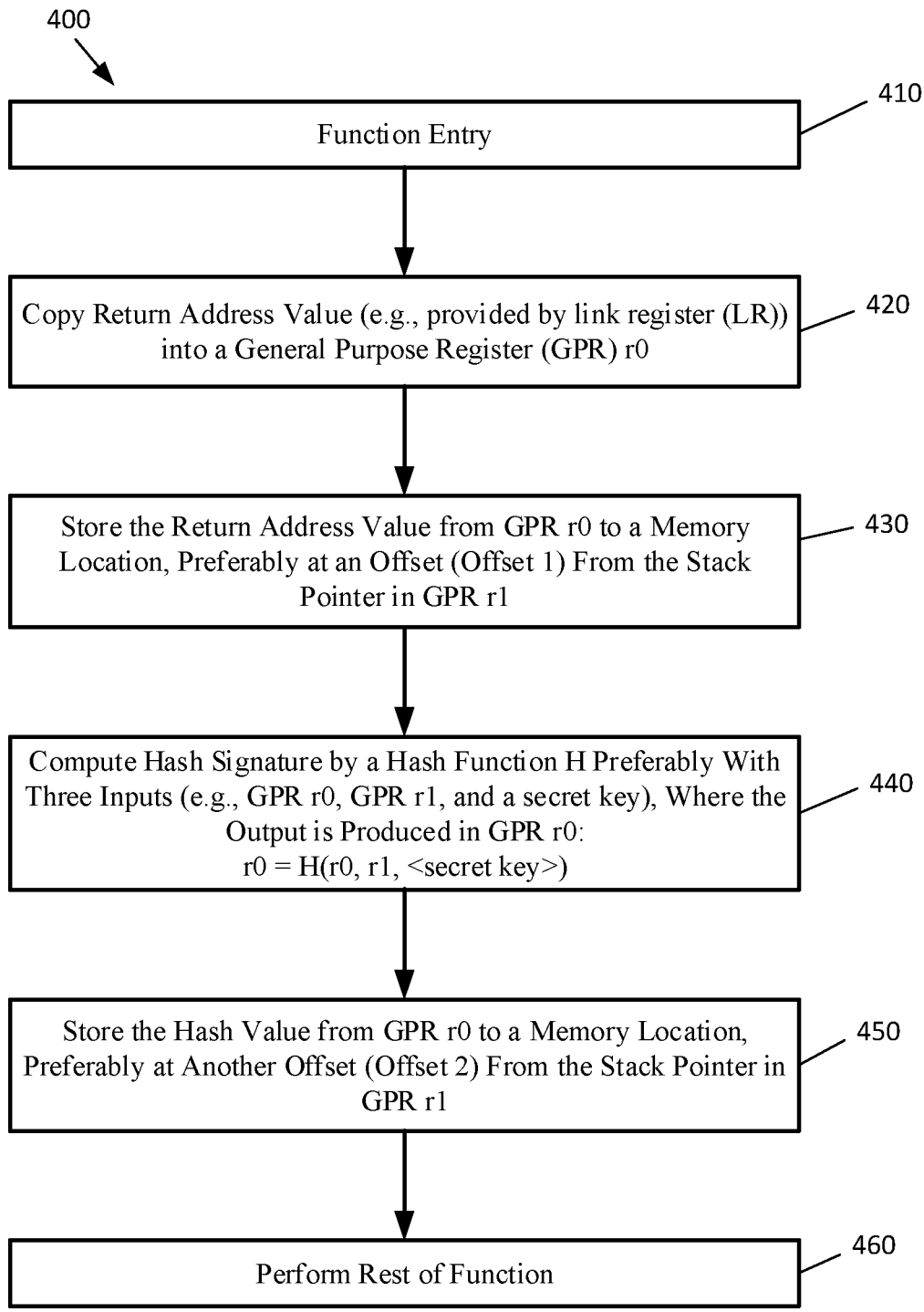
FIG. 4 depicts a flow chart of a method, according to an embodiment, of computing a hash upon a function entry while running a software program/application on a processor.

FIG. 4 illustrates an embodiment of a method 400 of undergoing a process to secure a processor and more specifically to make a processor more resistant to attack while running a software application. The method 400 more specifically is directed to computing and utilizing a cryptographic signature to make a processor more secure, particularly while operating a software application. While method 400 shown in FIG. 4 is described for the sake of convenience and not with an intent of limiting the disclosure as comprising a series of steps and/or number of steps, it is to be understood that the process does not need to be performed as a series of steps and/or the steps do not need to be performed in the order shown and described with respect to FIG. 4, but the process may be integrated and/or one of more steps may be performed together, simultaneously, or the steps may be performed in the order disclosed or in an alternative order, unless indicated otherwise.

The method 400 of making a processor executing a software application more secure, e.g., more resistant to attempts to control program flow and/or obtain unauthorized data access, includes at 410 undergoing function entry while for example executing a software application. In an example, during processing a function call (also referred to as function prologue) is encountered. At 420, upon function entry, a return address value is copied into a general purpose register, for example into GPR r0. In an aspect, the return address that is copied is provided by a link register (LR). In an aspect, the general purpose register, e.g., GPR r0, is a sixty-four (64) bit GPR, although other sizes are contemplated. At 430 the return address value from the general purpose register GPR r0 is stored to a memory location. That is, the value from GPR r0 in the example is moved to a memory location. In one or more embodiments, the value from GPR r0 is stored to memory preferably at an offset (e.g., offset 1) from the stack pointer in general purpose register GPR r1. For example, the offset can be a negative or positive offset from the stack pointer in GPR r1.

A hash (e.g., a signature) is computed at 440 using a hash function H. The hash computation can include a number of inputs or parameters, and in an embodiment includes three parameters or inputs. The results or output of the hash computation in an embodiment are produced in GPR r0, and in a preferred embodiment are sixty-four (64) bits. The three inputs or parameters for the hash computation are values in GPR r0, GPR r1, and a special purpose register (SPR). The value in the special purpose register (SPR) is a secret key, and the SPR in an aspect is referred to as "HASHKEYR". The value in special purpose register HASHKEYR in an embodiment is only accessible from a privilege level higher than the execution of the hash computation. The hash function H can be any number of hash functions and the method is not limited by the hash function H selected or used. In an embodiment a pre-defined hash function is used. The output to GPR r0 can in a specific preferred embodiment be represented by r0=H(GPR r0, GPR r1, HASHKEYR).

In one or more embodiments, at 450, the hash value output to GPR r0 is stored to a memory location, and in an embodiment is stored at another offset (offset 2) from the stack pointer in GPR r1. At 460, the rest of the function entered at 410 is performed. The processing of the function is performed and when the function is completed and the program is to exit the function (e.g., at function return) further processing is performed to check the hash signature performed at function entry to a recomputed hash performed at function exit.

Figure 5:
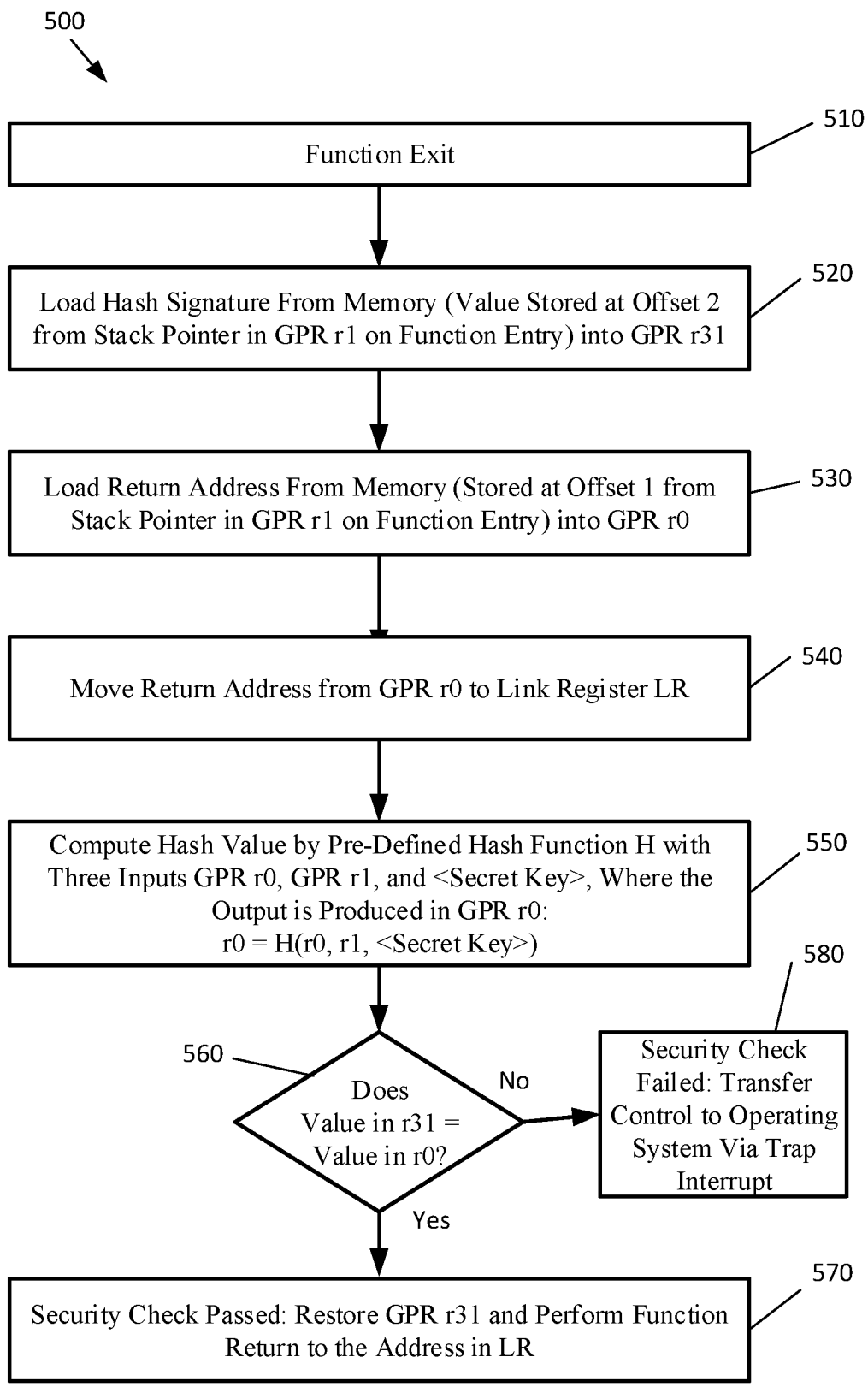
FIG. 5 depicts a flow chart of a method, according to an embodiment, of checking a hash upon function exit while running a software program/application on a processor. depicts a diagrammatic illustration of code for insertion into a software program at or before function exit to check a hash in accordance with an embodiment of the present disclosure.

FIG. 5 illustrates an embodiment of a method 500 of undergoing a process to secure a processor and more specifically to make a processor more resistant to attack while running a software application. The method 500 more specifically is directed to computing and utilizing a cryptographic signature to make a processor more secure, particularly while operating a software application. While method 500 shown in FIG. 5 is described for the sake of convenience and not with an intent of limiting the disclosure as comprising a series of steps and/or number of steps, it is to be understood that the process does not need to be performed as a series of steps and/or the steps do not need to be performed in the order shown and described with respect to FIG. 5, but the process may be integrated and/or one of more steps may be performed together, simultaneously, or the steps may be performed in the order disclosed or in an alternative order, unless indicated otherwise.

The method 500 of making a processor executing a software application more secure, e.g., more resistant to attempts to control program flow and/or obtain unauthorized data access, includes at 510 encountering a function exit (function return) instruction after the function has been completed, while for example executing a software application. In an example, during processing a function, the function completes, and the function exits or returns (also referred to as function epilogue). At 520, upon or prior to exiting the function, the hash signature from memory is loaded into a general purpose register (e.g., GPR r31). In an example, the value stored at offset 2 from the stack pointer in GPR r1 upon function entry, described at 450, is loaded into GPR r31. At 530, the return address from memory (e.g. stored at Offset 1 from stack pointer in GPR r1 as described with reference to FIG. 4 at 430) is loaded into GPR r0. At 540 the return address from GPR r0 is moved to the link register (LR).

A hash (e.g., a signature) is computed at 550 using a hash function H. In this regard the hash is recomputed at 550 in the same manner and using the values in the same registers that were used to compute the hash upon entering the function (e.g., the same manner the hash was computed at 440). The hash function H is the same hash function H used to compute the hash on function entry. The hash computation includes the same parameters as used when computing the hash upon entering the function. The result or output of the hash computation in an embodiment are produced in GPR r0, and is the same number of bits as used to compute the hash upon function entry. The three inputs or parameters for the hash computation in an embodiment are values in GPR r0, GPR r1, and the special purpose register (SPR), e.g., from "HASHKEYR". The output to GPR r0 from 550 can in a specific preferred embodiment be represented by r0=H(GPR r0, GPR r1, HASHKEYR).

At 560 it is determined whether the value in GPR r31 is the same as the value in GPR r0 (does the hash signature upon function entry equal the hash signature upon function exit?). If the hash signature values are the same (560: Yes), then the process 500 proceeds to 570 and the security check passed. At 570, GPR r31 is restored and function return or exit is performed to the address in the link register. If at 560, the hash value in GPR r31 does not equal the recomputed hash value in GPR r0 (560: No), then the process continues to 580 where the security check failed. In an embodiment, at 580 control is transferred to the operating system (OS) via a trap interrupt.

An example of instructions inserted into the code to compute a hash upon function call-up (function entry) according to an embodiment is described with reference to FIG. 6, where a new instruction "hashgen" supported in a processor computes a cryptographic hash of three parameters prior to or upon a function entry during processing of a software program/application. The computed cryptographic hash acts as a signature that is saved in general purpose register (GPR) 31. In FIG. 6, instruction numbers 0 & 1 perform the function of saving the value from logical register r0. More specifically, instruction 0, move from link register (mflr), moves the value from the link register into general purpose register (GPR) r0, and instruction 1 stores the value from the link register to a memory location at an offset 1 from the stack pointer in GPR r1. At instruction 2 the "hashgen" instruction is executed to compute the hash. In a preferred embodiment the hash is computed using three inputs, including the value in GPR r0, the value in GPR r1, and a secret key (preferably accessible from a special purpose register with a higher privilege level than the hashgen instruction), and outputs (returns) the hash computation to r0). Instruction 3 stores the hash value output to GPR r0 to a memory location at an offset 2 from the stack pointer in GPR r1. Instruction 4 saves the value in GPR 31 at an offset 3 from the stack pointer in GPR r1.

An example of instructions inserted into the code, by for example the compiler, to check a hash signature upon function return (function exit) according to an embodiment is described with reference to FIG. 7, where a new instruction "tdne" supported in a processor checks cryptographic hashes at function exit (return) during processing of a software program/application, and under conditions where hash signatures do not match performs a trap interrupt function. In FIG. 7, instruction 0 loads the hash signature stored in memory, e.g., the value stored at offset 2 from the stack pointer in GPR r1 that was computed upon function call up, to GPR r31. At instruction 1, the return address from memory (e.g., stored at offset 1 from stack pointer in GPR r1 during function entry micro-operations), is loaded into GPR r0. At instruction 2, the return address from GPR r0 is moved to the link register. At instruction 3, the "hashgen" instruction is executed to compute a second hash (signature 2) using the same hash function and the same parameters as used to compute the first hash that was computed upon function call-up (function entry). The hash is recomputed using three inputs, including the value in GPR r0, the value in GPR r1, and the secret key (preferably accessible from a special purpose register with a higher privilege level than the hashgen instruction), and outputs (returns) the second hash computation (signature 2) to r0. Instruction 4 checks the hash (signature 1) restored from memory (and computed upon function entry) against the hash (signature 2) recomputed at instruction 3 in FIG. 7 to verify whether or not the signatures match. Instruction 4 further performs the optional trap function if that micro-operation is included in the instruction and if the conditions are met (i.e., hash signature 1 does not match hash signature 2). Instruction 5 restores (loads) GPR r31 with the value at offset 3 from the stack pointer in GPR r1, and instruction 6 returns to the address in the link register.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By "integrated with", what is meant is that the processor has logic embedded therewith as hardware logic, such as an application specific integrated circuit (ASIC), a field programmable gate array (FPGA), etc. By "executable by the processor", what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of handling data in a processor, the method comprising:

in response to encountering a function call-up instruction for performing a function and prior to performing the function:
copying a return address value for the function into a second general purpose register;
storing the return address value from the second general purpose register to a second memory location;
computing an entry hash value using a hash of three hash input parameters, wherein a first one of the hash input parameters is a value from a first general purpose register, a second one of the hash input parameters is the return address value in the second general purpose register, and a third one of the hash input parameters is a secret key stored in a special purpose register; and
storing the entry hash value in a first memory location, and after completing the function and prior to exiting the function:
loading the entry hash value from the first memory location into a third general purpose register;
loading the return address value from the second memory location into the second general purpose register;
computing an exit hash value using the same hash used when computing the entry hash value and using three hash input exit parameters, wherein a first hash input exit parameter is the value from the first general purpose register, a second hash input exit parameter is the return address value in the second general purpose register, and a third hash input exit parameter is the secret key stored in the special purpose register;

determining if the entry hash value is the same as the exit hash value;

performing, in response to the entry hash value being equal to the exit hash value, a function return to exit the function; and executing, in response to the entry hash value not being equal to the exit hash value, a trap interrupt.

2. The method according to claim 1, wherein the first memory location is at a first offset from a stack pointer in the first general purpose register.

3. The method according to claim 1, further comprising:
in response to encountering the function call-up instruction for performing the function and prior to performing the function:
providing, by a link register, the return address value copied into the second general purpose register.

4. The method according to claim 1, wherein the second memory location is at a second offset from a stack pointer in the first general purpose register.

5. The method according to claim 1, wherein the special purpose register storing the secret key is accessible only in a privilege level higher than a privilege level computing the entry hash value.

6. The method according to claim 1, wherein the trap interrupt transfers control to an operating system.

7. The method according to claim 1, further comprising:
in response to encountering a function exit instruction:
moving the return address value from the second general purpose register to a link register.

8. The method according to claim 1, wherein a tag or context identifier (ID) is the value from the first general purpose register.

9. The method according to claim 1, further comprising:
after completing the function and prior to exiting the function:
storing the exit hash value in the second general purpose register;
determining if the entry hash value in the third general purpose register is the same as the exit hash value in the second general purpose register; and
in response to the entry hash value not equaling the exit hash value, transferring control to an operating system.

10. A system for executing instructions in a software application, the system comprising:
a processor having circuitry for processing programming instructions, the processor comprising:
a decode unit comprising circuitry for decoding the programming instructions;
an issue unit comprising circuitry for receiving the decoded programming instructions and issuing the decoded programming instructions, and
an execution unit comprising circuitry for executing the decoded programming instructions issued by the issue unit, the execution unit associated with a special purpose register; and
a non-transitory computer-readable medium having the programming instructions embodied therewith, the programming instructions executable by the processor to cause the processor to:
in response to encountering a function entry instruction for performing a function and prior to performing the function:
copy a return address value of the function into a second general purpose register;
store the return address value from the second general purpose register to a second memory location;
compute an entry hash value using a hash of three hash input parameters, wherein a first hash input parameter is a value from a first general purpose register, a second hash input parameter is the return address value from the second general purpose register, and a third hash input parameter is a secret key stored in the special purpose register; and
store the entry hash value in a first memory location; and
after completing the function and prior to exiting the function;
load the entry hash value from the first memory location into a third general purpose register;
load the return address value from the second memory location into the second general purpose register;
compute an exit hash value using the same hash used when computing the entry hash value and using three hash input exit parameters, wherein a first hash input exit parameter is the value from the first general purpose register, a second hash input exit parameter is the return address value in the second general purpose register, and a third hash input exit parameter is the secret key stored in the special purpose register; and
determine if the entry hash value is the same as the exit hash value.

11. The system according to claim 10, comprising a programming instruction executable by the processor to cause the processor to:
in response to encountering the function entry instruction for performing the function and prior to performing the function:
provide, by a link register, the return address value copied into the second general purpose register.

12. The system according to claim 11, comprising a programming instruction executable by the processor to cause the processor to:
prior to exiting the function:
move the return address value from the second general purpose register to the link register.

13. The system according to claim 10, wherein the special purpose register storing the secret key is accessible only in a privilege level higher than a privilege level computing the entry hash value.

14. The system according to claim 10, comprising programming instructions executable by the processor to cause the processor to:
in response to the entry hash value being equal to the exit hash value, perform a function return to exit the function; and
in response to the entry hash value not being equal to the exit hash value, execute a trap interrupt.

15. The system according to claim 14, wherein executing the trap interrupt causes control to transfer to an operating system.

16. The system according to claim 10, wherein a tag or context identifier (ID) is the value from the first general purpose register.

17. The system according to claim 10, further comprising programming instructions executable by the processor to cause the processor to:
after completing the function and prior to exiting the function:
storing the exit hash value in the second general purpose register;

determining if the entry hash value in the third general purpose register is the same as the exit hash value in the second general purpose register; and in response to the entry hash value not equaling the exit hash value, transferring control to an operating system, and wherein the first one of the hash input parameters is of double word length, the second of the hash input parameters is of double word length, and the secret key is of double word length.

18. A method of handling data in a processor, the method comprising:

in response to encountering a function call-up instruction to perform a function and prior to performing the function:

copying a return address value for the function into a first general purpose register;

storing the return address value from the first general purpose register to a second memory location;

computing an entry hash value using a hash of a plurality of hash input parameters, wherein the plurality of hash input parameters includes a first hash input parameter obtained from a second general purpose register, a second hash input parameter that is the return address value, and a third hash input parameter that is a secret key stored in a special purpose register, wherein the special purpose register is accessible only in a privilege level higher than a privilege level computing the entry hash value; and storing the entry hash value in a first memory location; and after completing the function and prior to exiting the function:

computing an exit hash value using the same hash used when computing the entry hash value and the same plurality of hash input parameters including a first hash input exit parameter obtained from the first general purpose register, a input second hash exit parameter obtained from the second general purpose register, and the secret key obtained from the special purpose register and;

storing the exit hash value in the first general purpose register;

loading the entry hash value from the first memory location to a third general purpose register;

determining if the entry hash value in the third general purpose register is the same as the exit hash value in the first general purpose register; and in response to the entry hash value not equaling the exit hash value, transferring control to an operating system.

19. The method according to claim 18, further comprising, in response to encountering the function call-up instruction to perform the function and prior to performing the function, using a tag or a context identifier (ID) as the value from the second general purpose register.

* * * * *